(12) United States Patent
Donovan

(10) Patent No.: US 11,192,353 B2
(45) Date of Patent: *Dec. 7, 2021

(54) SMOKE AND SOOT REMOVAL SYSTEMS FOR ADDITIVE MANUFACTURING

(71) Applicant: Delavan Inc., West Des Moines, IA (US)

(72) Inventor: Matthew Donovan, Ankeny, IA (US)

(73) Assignee: Delavan Inc., West Des Moines, IA (US)

( * ) Notice: Subject to any disclaimer, the term of this patent is extended or adjusted under 35 U.S.C. 154(b) by 48 days.

This patent is subject to a terminal disclaimer.

(21) Appl. No.: 16/557,749

(22) Filed: Aug. 30, 2019

(65) Prior Publication Data

US 2019/0381781 A1    Dec. 19, 2019

Related U.S. Application Data

(62) Division of application No. 15/096,340, filed on Apr. 12, 2016, now Pat. No. 10,399,323.

(51) Int. Cl.
*B33Y 30/00* (2015.01)
*B29C 64/35* (2017.01)
(Continued)

(52) U.S. Cl.
CPC ............ *B33Y 30/00* (2014.12); *B08B 15/002* (2013.01); *B08B 15/007* (2013.01); *B08B 15/04* (2013.01);
(Continued)

(58) Field of Classification Search
CPC ..... B08B 15/002; B08B 15/007; B08B 15/04; B29C 64/35; B33Y 30/00; F16L 41/004; F16L 41/12; F16L 37/00
(Continued)

(56) References Cited

U.S. PATENT DOCUMENTS

| 1,908,821 A | 5/1933 | Cornell |
| 4,253,224 A | 3/1981 | Hickman et al. |

(Continued)

FOREIGN PATENT DOCUMENTS

| DE | 102014209161 A1 | 11/2015 |
| EP | 0606538 A1 | 7/1994 |

(Continued)

OTHER PUBLICATIONS

Extended European Search Report prepared, of the European Patent Office, dated Sep. 5, 2017, issued in corresponding European Patent Application No. 17166216.6.

*Primary Examiner* — Matthew J Daniels
*Assistant Examiner* — Yunju Kim
(74) *Attorney, Agent, or Firm* — Locke Lord LLP; Daniel J. Fiorello; Gabby Gelozin

(57) ABSTRACT

An intake manifold for an additive manufacturing system includes a body defining a flow channel therein. The body includes an inlet end defining an inlet configured to intake gas and/or particles from a build area of the additive manufacturing system, and an outlet end defining an outlet that is fluidly connected to the inlet through the flow channel. The outlet is configured to be in fluid communication with an uptake manifold of the additive manufacturing system. The intake manifold also includes at least one mount extending from the outlet end of the body that is configured to rotatably mount the body to the uptake manifold.

14 Claims, 3 Drawing Sheets

(51) Int. Cl.
   *B29C 64/106* (2017.01)
   *B22F 10/20* (2021.01)
   *B08B 15/00* (2006.01)
   *B08B 15/04* (2006.01)

(52) U.S. Cl.
   CPC ............ *B22F 10/20* (2021.01); *B29C 64/106* (2017.08); *B29C 64/35* (2017.08); *Y02P 10/25* (2015.11)

(58) Field of Classification Search
   USPC .......................................................... 425/73
   See application file for complete search history.

(56) References Cited

U.S. PATENT DOCUMENTS

| | | |
|---|---|---|
| 4,966,397 A | 10/1990 | McKinnon |
| 5,336,130 A | 8/1994 | Ray |
| 6,056,073 A | 5/2000 | Boulet |
| 6,663,610 B1 | 12/2003 | Thompson et al. |
| 2008/0169586 A1 | 7/2008 | Hull et al. |
| 2015/0027993 A1 | 1/2015 | Bruck et al. |
| 2017/0072468 A1 | 3/2017 | Schilling et al. |

FOREIGN PATENT DOCUMENTS

| | | |
|---|---|---|
| WO | 1997005421 A1 | 2/1997 |
| WO | 2002038033 A2 | 5/2002 |

SMOKE AND SOOT REMOVAL SYSTEMS FOR ADDITIVE MANUFACTURING

CROSS-REFERENCE TO RELATED APPLICATION

This application is a divisional application of, and claims the benefit and priority of, U.S. patent application Ser. No. 15/096,340 filed on Apr. 12, 2016, the disclosure of which is incorporated by reference in its entirety.

BACKGROUND

1. Field

The present disclosure relates to additive manufacturing, more specifically to smoke and soot removal systems for additive manufacturing.

2. Description of Related Art

Certain laser based powder bed fusion additive manufacturing systems remove smoke and soot during the manufacturing process. Smoke is generated when the laser welds the powder to the previous layer. Smoke generated can cause build quality issues including failures. Traditional systems only remove smoke by using an intake pipe that is disposed several inches away from the source of smoke generation (e.g. the build area).

Such conventional methods and systems have generally been considered satisfactory for their intended purpose. However, there is still a need in the art for smoke and soot removal systems for additive manufacturing. The present disclosure provides a solution for this need.

SUMMARY

An intake manifold for an additive manufacturing system includes a body defining a flow channel therein. The body includes an inlet end defining an inlet configured to intake gas and/or particles from a build area of the additive manufacturing system, and an outlet end defining an outlet that is fluidly connected to the inlet through the flow channel. The outlet is configured to be in fluid communication with an uptake manifold of the additive manufacturing system. The intake manifold also includes at least one mount extending from the outlet end of the body that is configured to rotatably mount the body to the uptake manifold.

The at least one mount can include two mounts disposed at opposite lateral sides of the body. The two mounts can include a C-shape configured to mount to the uptake manifold. The intake manifold can include pair of bearings configured to be attached to the uptake manifold and to fit within the C-shape mounts to allow the body to rotate around the uptake manifold on the bearings. In certain embodiments, the body can include a curved shape on at least a rear face thereof for indexing against a roller of the additive manufacturing system such that the roller can push against the rear face of the body to rotate the body about the uptake manifold.

The intake manifold can include one or more border inlet arms extending from the inlet end and configured to border at least a portion of the build area to allow gas and/or particulate intake from the build area. The inlet can include a plurality of openings disposed on the inlet end and the border inlet arms. The intake manifold can include at least one of a polymer, ceramic, or a metal or any other suitable material.

In accordance with at least one aspect of this disclosure, an additive manufacturing system can include an uptake manifold and an intake manifold as described above rotatably connected to the uptake manifold.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
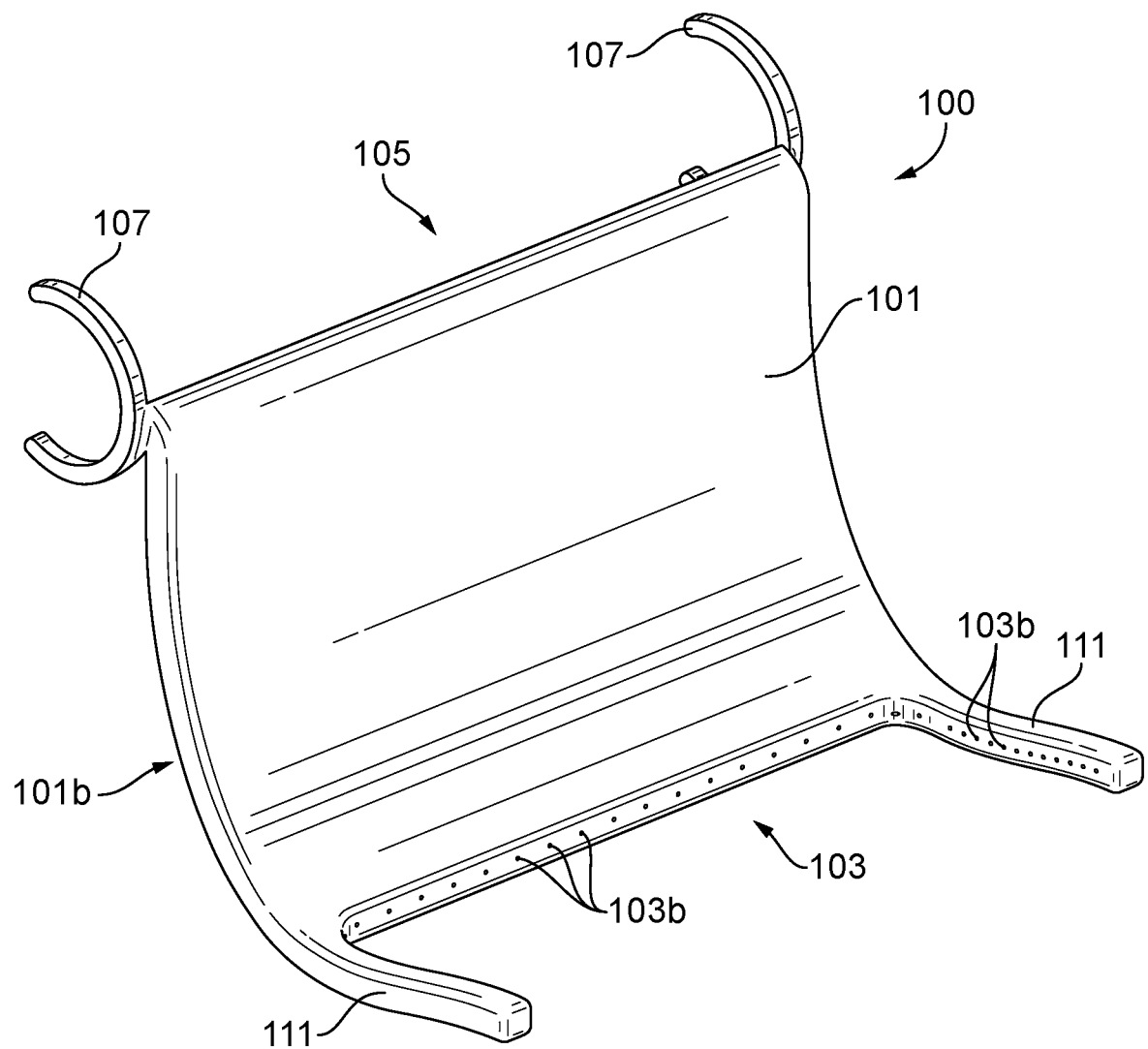
FIG. 1A is a perspective view of an embodiment of an intake manifold in accordance with this disclosure.
Figure 1B:
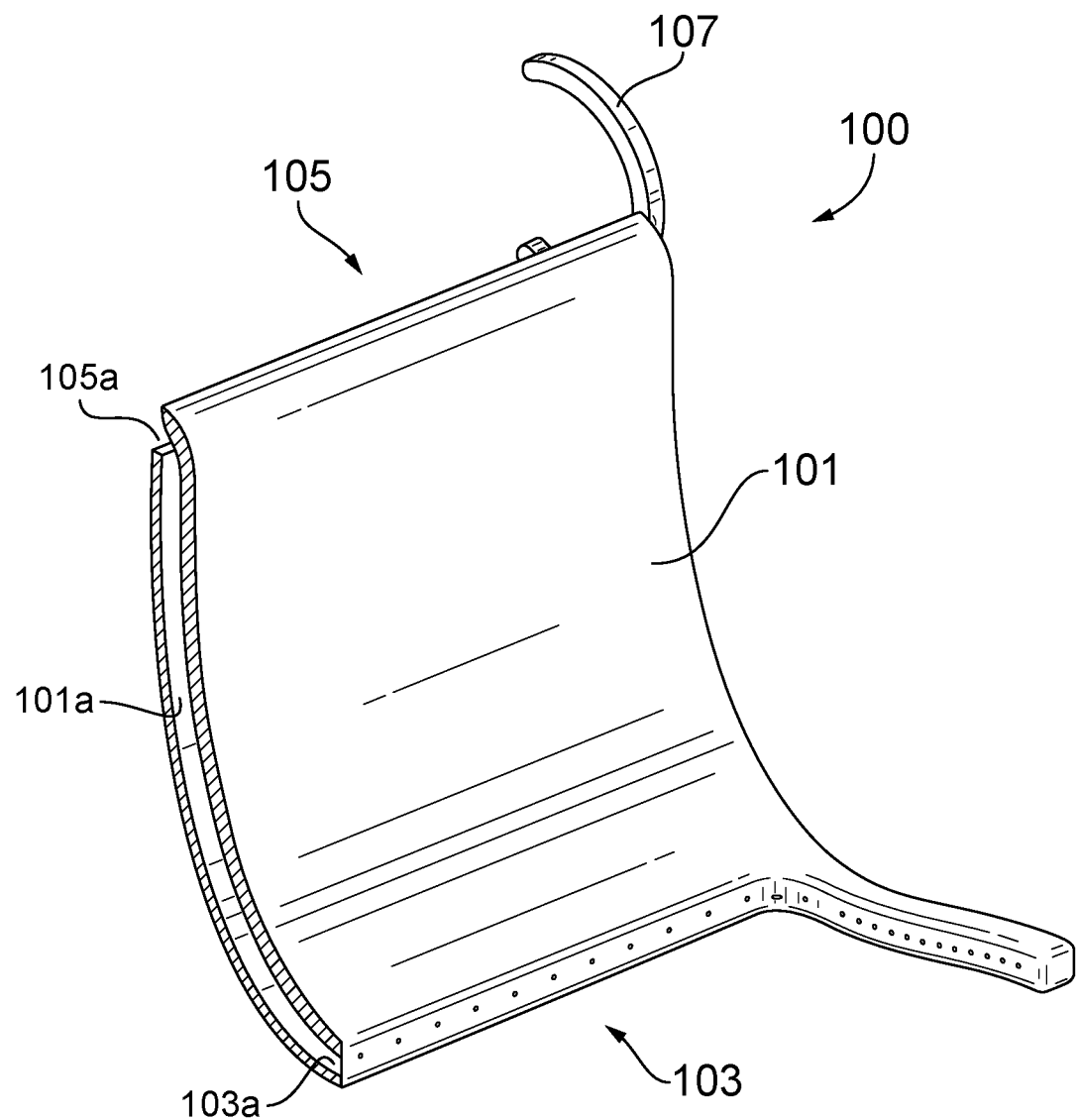
FIG. 1B is a perspective cross-sectional view of the embodiment of FIG. 1A.

Reference will now be made to the drawings wherein like reference numerals identify similar structural features or aspects of the subject disclosure. For purposes of explanation and illustration, and not limitation, an illustrative view of an embodiment of an intake manifold in accordance with the disclosure is shown in FIGS. 1A and is designated generally by reference character 100. Other embodiments and/or aspects of this disclosure are shown in FIGS. 1B-3. The systems and methods described herein can be used to improve smoke and soot removal and improve build quality of an additive manufacturing system.

Figure 2:
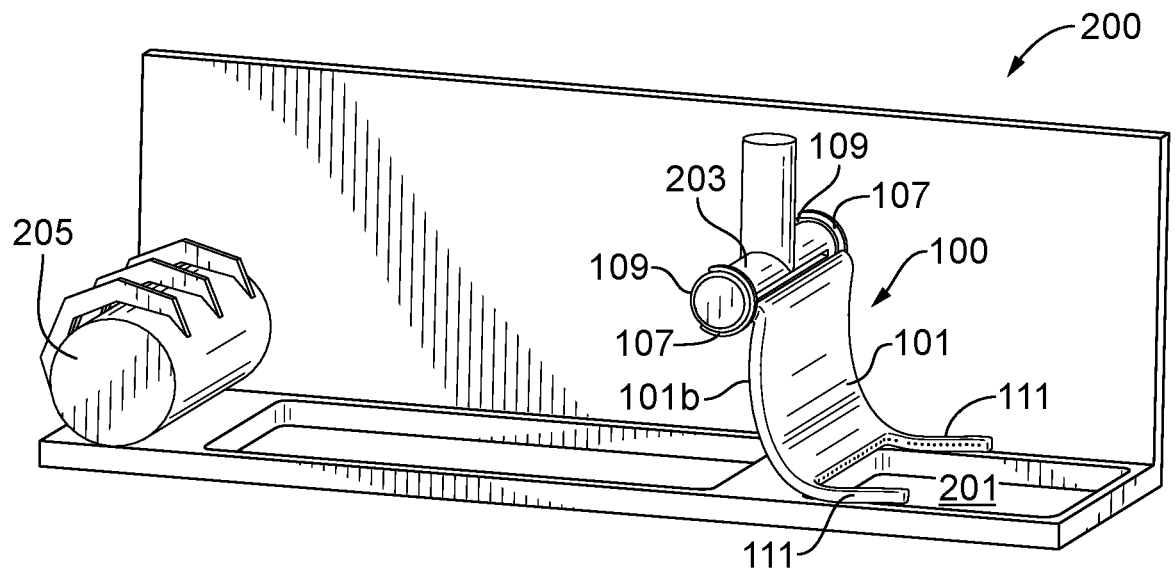
FIG. 2 is a partial perspective view of an embodiment of a system in accordance with this disclosure, showing the intake manifold of FIG. 1A rotatably disposed on an uptake manifold.

Referring to FIGS. 1A-2, an intake manifold 100 for an additive manufacturing system (e.g., system 200 as shown in FIG. 2) includes a body 101 defining a flow channel 101a therein. The body 101 includes an inlet end 103 defining an inlet 103a configured to intake gas and/or particles from a build area (e.g., build area 201 as shown in FIG. 2) of the additive manufacturing system. The body 101 also defines an outlet end 105 defining an outlet 105a fluidly connected to the inlet 103a through the flow channel 101a.

The intake manifold 100 can include at least one of a polymer, ceramic, or a metal. Any other suitable material for the intake manifold 100 is contemplated herein.

The outlet 105a is configured to be in fluid communication with an uptake manifold 203 of the additive manufacturing system 100 such that the uptake manifold can pull gas and/or particulate through the inlet 103a, through the flow channel 101a, and out through the outlet 105a. While not shown, it is contemplated that a seal or other flexible channel can be disposed between the uptake manifold 203 and the outlet end 105, and/or the outlet end 105 can conform to the shape of the uptake manifold 203 such that leakage between the uptake manifold 203 and the outlet end 105 is prevented.

The intake manifold 100 also includes one or more mounts 107 extending from the outlet end 105 of the body 101. The mounts 107 are configured to rotatably mount the body 101 to the uptake manifold 203.

In certain embodiments, as shown, the one or more mounts 107 can include two mounts 107 disposed at opposite lateral sides of the body 101. Also as shown, the two mounts 107 can include a C-shape configured to mount to the uptake manifold 203 (e.g., which has a pipe shape). Any other suitable shape for the one or more mounts 107 is contemplated herein.

The intake manifold 100 can include one or more border inlet arms 111 extending from the inlet end 103 and configured to border at least a portion of the build area 201 to allow gas and/or particulate intake from the build area 201 around at least a portion of the perimeter of the build area 201. In this regard, at least a portion of the arms 111 can be hollow. It is contemplated that the border inlet arms 111 can extend down an entire length of the build area 201 and/or completely surround the perimeter of the build area 201 (e.g., by forming a square frame).

As shown, the inlet 103a can include a plurality of openings 103b disposed on the inlet end 103 and/or the border inlet arms 111. The openings 103b can be of a suitable size to allow soot and smoke to be drawn through without allowing powder from the build area 201 to be pulled through. In certain embodiments, the openings 103b can open upwardly such that gas and or particulate is pulled in from just above the build area 201 (e.g., such that a longitudinal direction of the channel through the wall defining the inlet 103a and/or the arms 111 points at least partially upward). Any other suitable size and/or shape of the openings 103b is contemplated herein.

Figure 3:
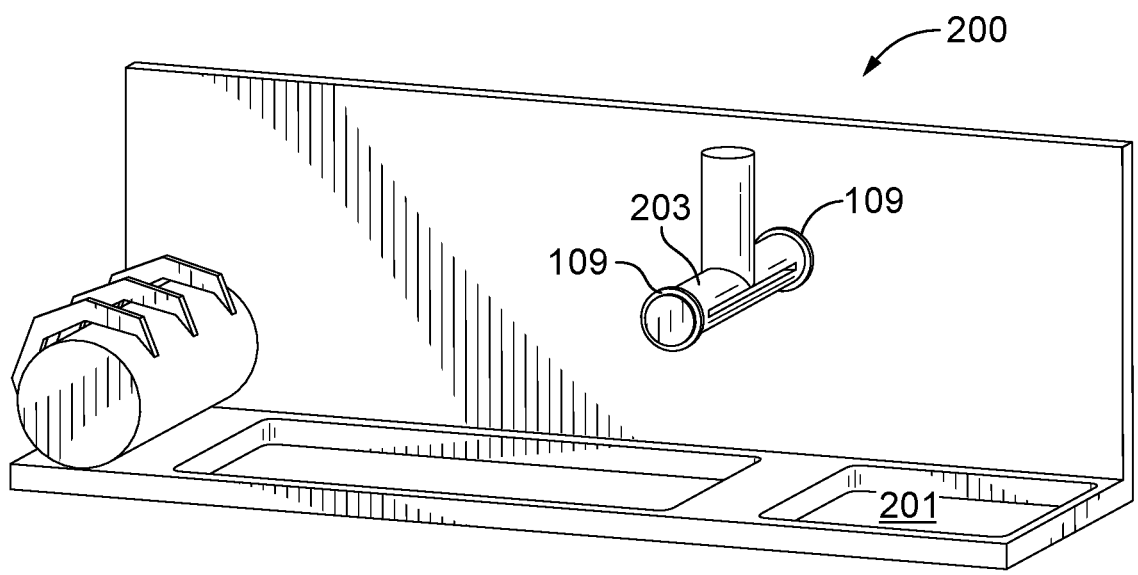
FIG. 3 is a partial perspective view of an embodiment of a system in accordance with this disclosure, showing a pair of bearings disposed on an uptake manifold.

Referring additionally to FIG. 3, the intake manifold 100 and/or the system 200 can include one or more bearings 109 (e.g., a pair as shown) that are configured to be attached to the uptake manifold 203 and to fit within the mounts 107 to allow the body 101 to rotate around the uptake manifold 203 on the bearings 109. For example, the bearings 109 can be first placed on the uptake manifold 203, and then the mounts 107 can be clips to the bearings 109.

The bearings 109 can include any suitable type of bearing (e.g., nylon or other low friction material bushings, a ball bearing). It is contemplated that the mounts 107 can rotatably mount to the uptake manifold 203 in any other suitable manner.

In certain embodiments, the body 101 can include a curved shape on at least a rear face 101b thereof for indexing against a roller 205 of the additive manufacturing system 200 such that the roller 205 can push against the rear face 101b of the body 101 to rotate the body 101 about the uptake manifold 203. For example, the roller 205 can translate across the system 200 to roll powder onto the build area 201. The roller 205 can contact the rear face 101b and lifts the intake manifold 100 out of the way, allowing the roller 205 to roll over the build area 201.

As shown, the arms 111 can rest on top of the roller 205 as the roller 205 traverses the build area 201. However, it is contemplated that the roller 205 can be configured to hold up an intake manifold 100 that does not have arms 111 (e.g., with extensions extending backward from the roller 205 to hold the intake manifold up).

As is appreciated by those skilled in the art, when the roller 205 moves out of the build area 201, the intake manifold 100 can then fall back downward. It is contemplated that the intake manifold 100 can be electrically and/or mechanically (e.g., via a suitable motor) operated by a controller (e.g., a CPU) of the system 200 to raise up and lower without the assistance of the roller 205.

Embodiments as described above can dramatically improve smoke removal of the certain additive manufacturing systems (e.g., the ProX300™ system) thereby improving part build reliability and part quality. For example, certain embodiments allow smoke to be remove from two, three, and/or four sides of the build area 201, which can significantly improving inerting atmosphere and build quality, as well as preventing particulate clouds The methods and systems of the present disclosure, as described above and shown in the drawings, provide for additive manufacturing systems and devices with superior properties including improved gas and particulate removal/evacuation. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. An intake manifold for an additive manufacturing system, comprising:
   a body defining a flow channel therein, the body including:
      an inlet end defining an inlet configured to intake gas and/or particles from a build area of the additive manufacturing system; and
      an outlet end defining an outlet that is fluidly connected to the inlet through the flow channel, the outlet configured to be in fluid communication with an uptake manifold of the additive manufacturing system;
   at least one mount extending from the outlet end of the body rotatably and detachably mounted to the uptake manifold; and
   one or more border inlet arms extending from the inlet end and configured to border at least a portion of the build area to allow gas and/or particulate intake from the build area.

2. The intake manifold of claim 1, wherein the inlet includes a plurality of openings disposed on the inlet end and the border inlet arms.

3. The intake manifold of claim 1, wherein the two mounts are disposed at opposite lateral sides of the body.

4. The intake manifold of claim 3, wherein the two mounts include a C-shape configured to mount to the uptake manifold.

5. The intake manifold of claim 4, further comprising pair of bearings configured to be attached to the uptake manifold and to fit within the C-shape mounts to allow the body to rotate around the uptake manifold on the bearings.

6. The intake manifold of claim 1, wherein the body includes a curved shape on at least a rear face thereof for indexing against a roller of the additive manufacturing system such that the roller can push against the rear face of the body to rotate the body about the uptake manifold.

7. The intake manifold of claim 1, wherein the intake manifold includes at least one of a polymer, ceramic, or a metal.

8. An additive manufacturing system, comprising: an uptake manifold;
   an intake manifold including a body defining a flow channel therein, the body including:
      an inlet end defining an inlet configured to intake gas and/or particles from a build area of the additive manufacturing system; and an outlet end defining an outlet that is fluidly connected to the inlet through the flow channel, the outlet configured to be in fluid communication with the uptake manifold of the additive manufacturing system;

at least one mount extending from the outlet end of the body and rotatably mounted to the uptake manifold; and one or more border inlet arms extending from the inlet end and configured to border at least a portion of the build area to allow gas and/or particulate intake from the build area.

9. The additive manufacturing system of claim 8, wherein the inlet includes a plurality of openings disposed on the inlet end and the border inlet arms.

10. The additive manufacturing system of claim 9, wherein the two mounts are disposed at opposite lateral sides of the body.

11. The additive manufacturing system of claim 10, wherein the two mounts include a C-shape configured to mount to the uptake manifold.

12. The additive manufacturing system of claim 11, further comprising pair of bearings configured to be attached to the uptake manifold and to fit within the C-shape mounts to allow the body to rotate around the uptake manifold on the bearings.

13. The additive manufacturing system of claim 8, wherein the body includes a curved shape on at least a rear face thereof for indexing against a roller of the additive manufacturing system such that the roller can push against the rear face of the body to rotate the body about the uptake manifold.

14. The additive manufacturing system of claim 8, wherein the intake manifold includes at least one of a polymer, ceramic, or a metal.

* * * * *